(12) United States Patent
Garabello et al.

(10) Patent No.: US 11,982,201 B2
(45) Date of Patent: May 14, 2024

(54) DAMPER SYSTEM FOR AN ENGINE SHAFT

(71) Applicant: GE Avio S.r.l., Rivalta di Torino (IT)

(72) Inventors: Marco Garabello, Rivalta di Torino (IT); Simone Iurlaro, Rivalta di Torino (IT); Salvatore Garofalo, Rivalta di Torino (IT); Alessio Gargioli, Rivalta di Torino (IT); Giuseppe Argentieri, Rivalta di Torino (IT)

(73) Assignee: GE AVIO S.R.L., Rivalta di Torino (IT)

( * ) Notice: Subject to any disclaimer, the term of this patent is extended or adjusted under 35 U.S.C. 154(b) by 61 days.

(21) Appl. No.: 17/644,411

(22) Filed: Dec. 15, 2021

(65) Prior Publication Data
US 2023/0019363 A1 Jan. 19, 2023

(30) Foreign Application Priority Data
Jul. 16, 2021 (IT) .................. 102021000018935

(51) Int. Cl.
| | |
|---|---|
| *F01D 5/02* | (2006.01) |
| *F02C 7/36* | (2006.01) |
| *F02C 9/00* | (2006.01) |
| *F16C 1/02* | (2006.01) |
| *F16D 3/06* | (2006.01) |

(Continued)

(52) U.S. Cl.
CPC .............. *F01D 5/026* (2013.01); *F02C 7/36* (2013.01); *F02C 9/00* (2013.01); *F16C 1/02* (2013.01); *F16D 3/06* (2013.01); *F16H 1/28* (2013.01); *F16H 57/0025* (2013.01); *F05D 2220/324* (2013.01); *F05D 2220/325* (2013.01); *F05D 2220/326* (2013.01); *F05D 2220/327* (2013.01); *F05D 2230/60* (2013.01); *F05D 2240/62* (2013.01); *F05D 2260/40311* (2013.01); *F05D 2260/96* (2013.01); *F05D 2270/07* (2013.01); *F16C 2360/23* (2013.01)

(58) Field of Classification Search
CPC .... F01D 5/026; F02C 7/36; F02C 7/32; F05D 2260/40311; F05D 2240/60; F02K 3/06; F16C 1/00; F16C 1/02; F16H 1/28
See application file for complete search history.

(56) References Cited

U.S. PATENT DOCUMENTS

| | | |
|---|---|---|
| 2,609,065 A | 9/1952 | Douglas |
| 3,589,832 A | 6/1971 | Harris et al. |

(Continued)

FOREIGN PATENT DOCUMENTS

| | | | | |
|---|---|---|---|---|
| CA | 2152789 C | | 7/2003 | |
| CN | 115614159 A | * | 1/2023 | ............. F01D 5/026 |

(Continued)

*Primary Examiner* — Craig Kim
(74) *Attorney, Agent, or Firm* — Venable LLP; Kurt W. R. Bessel; Michele V. Frank

(57) ABSTRACT

An engine assembly defining an axial direction (A) and including a gearbox, an engine core including at least one rotor, and a flexible coupling shaft having a first end and a second end along the axial direction (A). The first end of the flexible coupling shaft is connected to the engine core and the second end of the flexible coupling shaft is connected to the gearbox. A damper system is positioned at the second end of the flexible coupling shaft. The damper system is configured to reduce vibrations to the flexible coupling shaft during operation of the engine assembly.

14 Claims, 12 Drawing Sheets

(51) Int. Cl.
*F16H 1/28* (2006.01)
*F16H 57/00* (2012.01)

(56) References Cited

U.S. PATENT DOCUMENTS

| | | | |
|---|---|---|---|
| 4,527,911 A | 7/1985 | Davis | |
| 5,433,674 A * | 7/1995 | Sheridan | F01D 5/02 475/346 |
| 6,223,616 B1 | 5/2001 | Sheridan | |
| 8,740,549 B2 | 6/2014 | Shashank et al. | |
| 9,279,449 B2 | 3/2016 | Rouesne | |
| 9,644,541 B2 | 5/2017 | Morreale et al. | |
| 9,726,039 B2 | 8/2017 | Belmonte et al. | |
| 9,850,820 B2 * | 12/2017 | Pettinotti | F01D 25/164 |
| 9,915,174 B1 * | 3/2018 | Morris | F16F 9/02 |
| 10,119,548 B2 * | 11/2018 | Venter | F04D 29/325 |
| 10,982,563 B1 * | 4/2021 | Spruce | F16H 57/0469 |
| 11,391,326 B2 * | 7/2022 | Garabello | F02K 3/06 |
| 11,415,064 B2 * | 8/2022 | Husband | F02C 7/06 |
| 11,448,164 B2 * | 9/2022 | Gaskell | F02C 7/36 |
| 2004/0228701 A1 | 11/2004 | Blatz | |
| 2010/0111691 A1 * | 5/2010 | Heywood | F02C 7/36 415/230 |
| 2012/0192572 A1 * | 8/2012 | Miller | F16C 37/007 60/806 |
| 2016/0146102 A1 * | 5/2016 | McCune | F02C 7/36 415/122.1 |
| 2017/0211484 A1 * | 7/2017 | Sheridan | F02C 7/36 |
| 2017/0248033 A1 * | 8/2017 | Moniz | F01D 25/164 |
| 2019/0071997 A1 * | 3/2019 | Jonsson | F02C 7/06 |
| 2019/0257214 A1 | 8/2019 | Pankratov et al. | |
| 2019/0383331 A1 * | 12/2019 | Garabello | F16D 3/74 |
| 2019/0389562 A1 * | 12/2019 | Garabello | B64C 11/40 |
| 2019/0390604 A1 | 12/2019 | Garabello et al. | |
| 2020/0003290 A1 * | 1/2020 | Garabello | F01D 17/04 |
| 2020/0102985 A1 * | 4/2020 | Lighty | F16C 33/6651 |
| 2020/0247529 A1 * | 8/2020 | Lauria | G01D 5/247 |
| 2020/0248630 A1 | 8/2020 | Garabello et al. | |
| 2021/0148287 A1 * | 5/2021 | Husband | F02K 3/06 |
| 2021/0189956 A1 * | 6/2021 | Kannangara | F01D 15/12 |
| 2021/0189962 A1 * | 6/2021 | Gaskell | F02C 7/06 |
| 2021/0246835 A1 * | 8/2021 | Garabello | F02C 7/32 |
| 2021/0310419 A1 * | 10/2021 | Spruce | F16H 57/08 |
| 2022/0316359 A1 * | 10/2022 | Bessy | F04D 29/056 |
| 2023/0019363 A1 * | 1/2023 | Garabello | F16C 1/02 |

FOREIGN PATENT DOCUMENTS

| | | | | |
|---|---|---|---|---|
| CN | 218512227 U | * | 2/2023 | |
| CN | 115492773 B | * | 3/2023 | |
| DE | 102017124049 B4 | * | 2/2023 | B64D 27/16 |
| EP | 3096040 A1 | | 11/2016 | |
| FR | 3108681 A1 | * | 10/2021 | F01D 17/00 |
| GB | 1334454 A | | 10/1973 | |
| IT | UB20159384 A1 | | 6/2017 | |
| WO | WO-2023030676 A1 | * | 3/2023 | F16H 57/0025 |

* cited by examiner

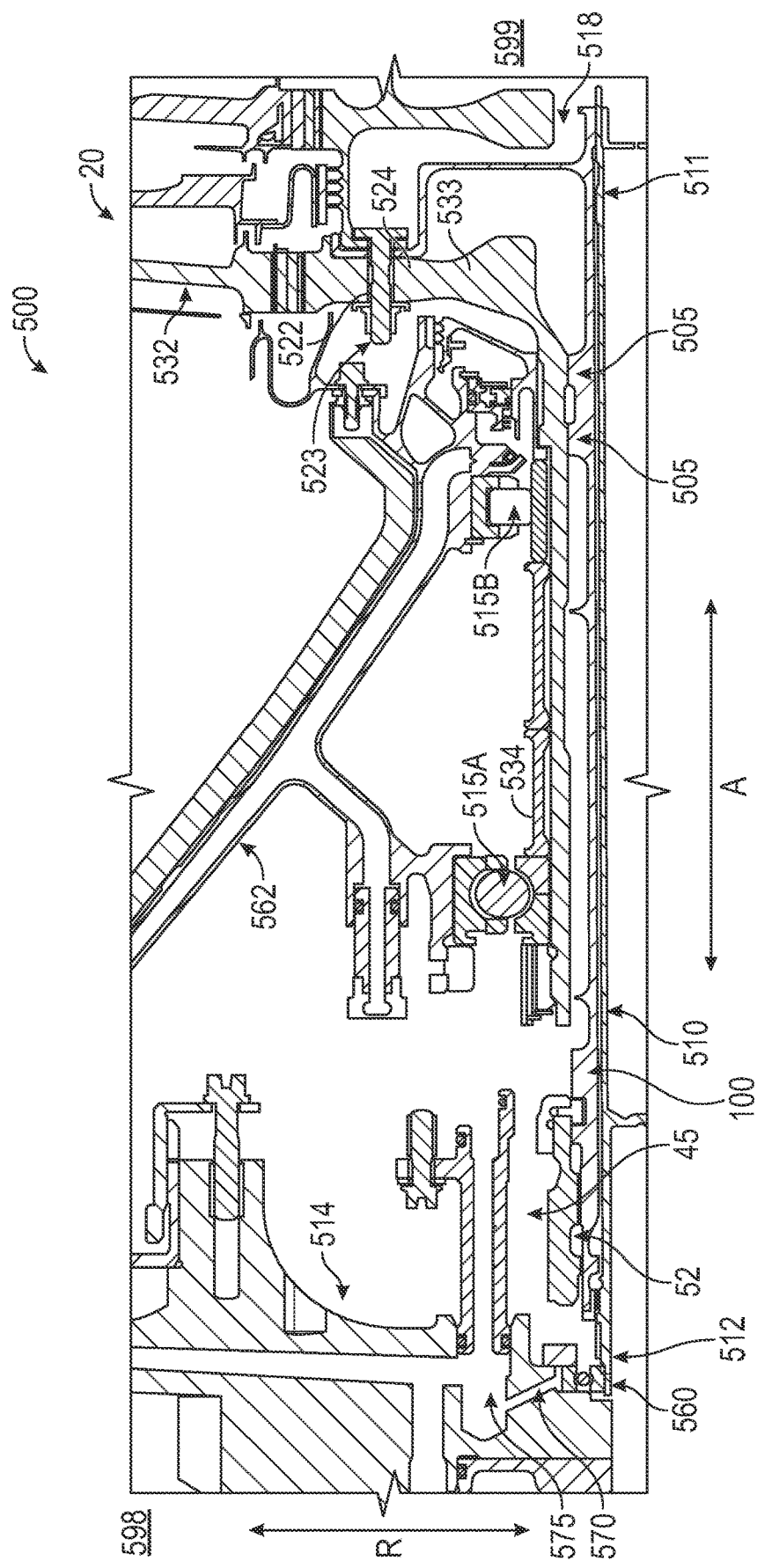

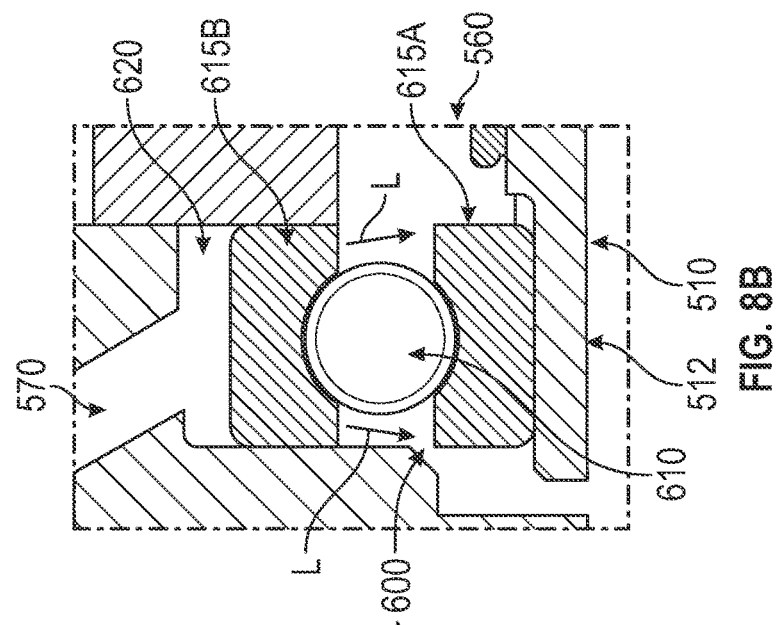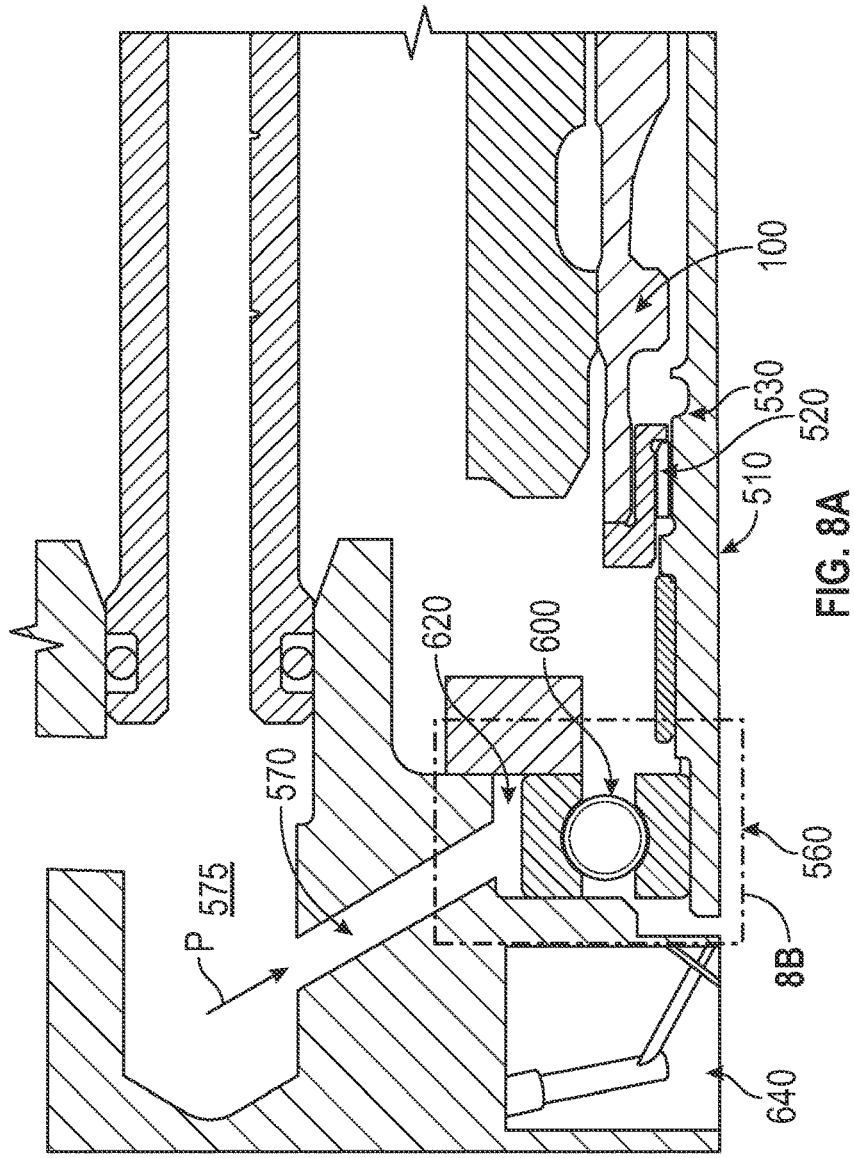

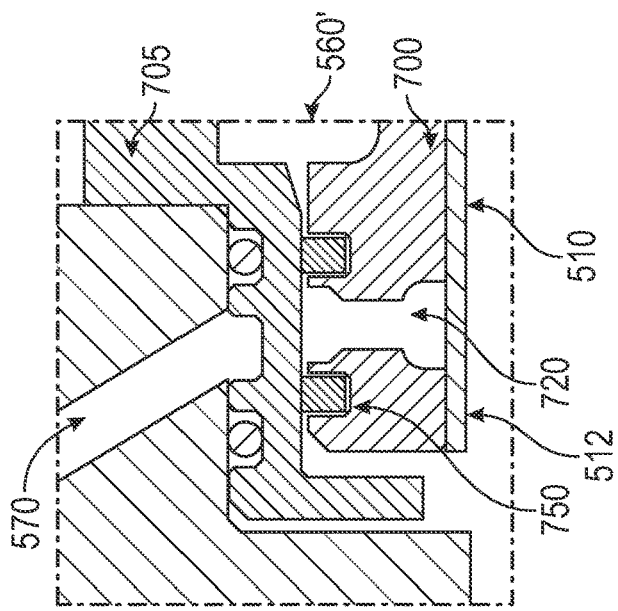
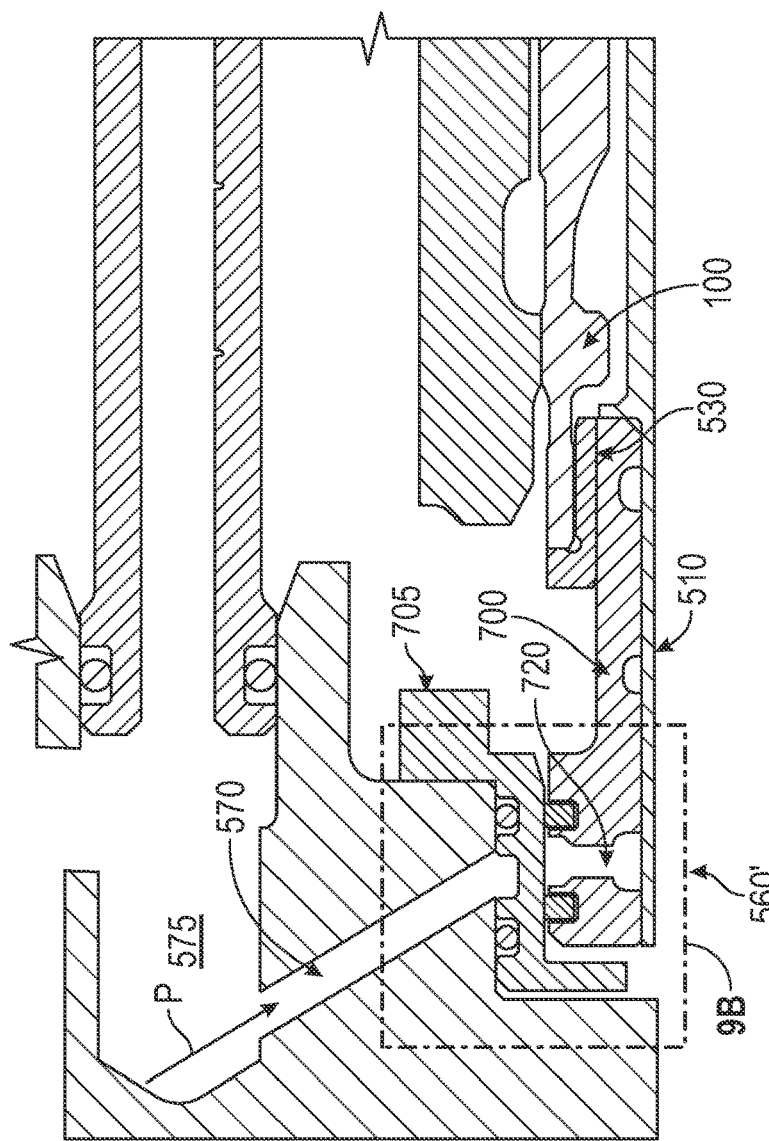
FIG. 9B
FIG. 9A

DAMPER SYSTEM FOR AN ENGINE SHAFT

CROSS REFERENCE TO RELATED APPLICATIONS

The present application claims the benefit of Italian Patent Application No. 102021000018935, filed on Jul. 16, 2020, which is hereby incorporated by reference herein in its entirety.

TECHNICAL FIELD

The present disclosure generally relates to turbine engines. In particular, the present disclosure relates to a damper system for an engine shaft of a turbine engine.

BACKGROUND

Turbine engines are continually challenged to increase efficiencies related to performance, fuel consumption, and noise output while generally maintaining or decreasing turbine engine packaging (e.g., axial or radial dimensions). One solution for increasing turbine engine efficiency is introducing a reduction gearbox or a power gearbox between an engine core and a fan or a propeller, such as some in turboprop, turboshaft, and turbofan turbine engine configurations.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 7 illustrates a cross-sectional view of an arrangement in a turbine engine for connecting a gearbox to an engine core with a shaft that includes a damper system according to one embodiment of the present disclosure.

FIGS. 8A and 8B illustrate enlarged, partial cross-sectional views of the damper system shown in FIG. 7 according to one embodiment of the present disclosure.

FIGS. 9A and 9B illustrate enlarged, partial cross-sectional views of a damper system according to another embodiment of the present disclosure.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the disclosure.

The present disclosure relates to systems for and methods of connecting a turbine engine gearbox and an engine core. The system includes a flexible coupling shaft connecting a reduction gearbox or a power gearbox of a fan or a propeller assembly to an engine core. The flexible coupling shaft generally includes a fastening arrangement or a fixed arrangement to a rotor of the engine core and a flexible arrangement coupled to the gearbox. The flexible coupling shaft generally provides for axial deformation and/or radial deformation of the shaft while maintaining connection to and necessary movement of the engine core and the gearbox. According to one embodiment, the shaft is flexible because only one end of the shaft is fixed (or immovable) to the engine core via, e.g., mechanical fasteners, while the other end of the shaft, which is in contact with, for example, a sun gear system, is free or "floating" (e.g., flexible or movable), which allows for the possibility to share better load contacts with one or more planet gears. One problem with including such a flexible shaft in a turbine engine is the vibrations and/or oscillations that occur to the shaft due to high-speed revolutions of the engine system. For example, the flexible shaft generally acts as a cantilever beam. Thus, vibrations to this flexible shaft cause wear and fretting events to occur to various components, including, e.g., bushings designed to support various components. Thus, the present disclosure relates to a damper system that is disposed at the free end of the flexible shaft to limit shaft vibrations and/or oscillations during a running cycle of the turbine engine. According to one embodiment, the damper system comprises an oil system to ensure flexibility and/or adaptability of the shaft in a sun gear configuration.

Figure 1:
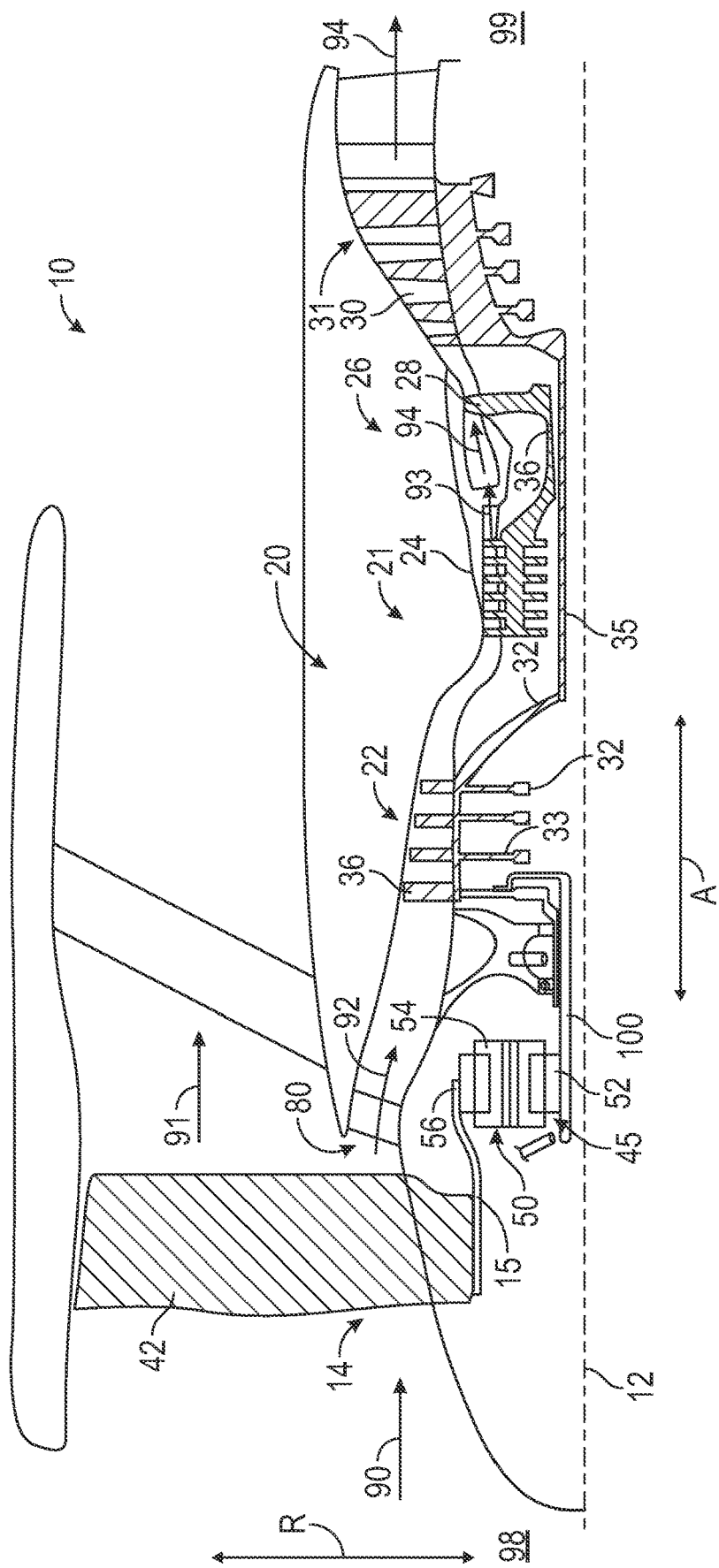
FIG. 1 illustrates a cross-sectional view of a system of connecting a gearbox to an engine core in a turbine engine according to one embodiment of the present disclosure.
Figure 2:
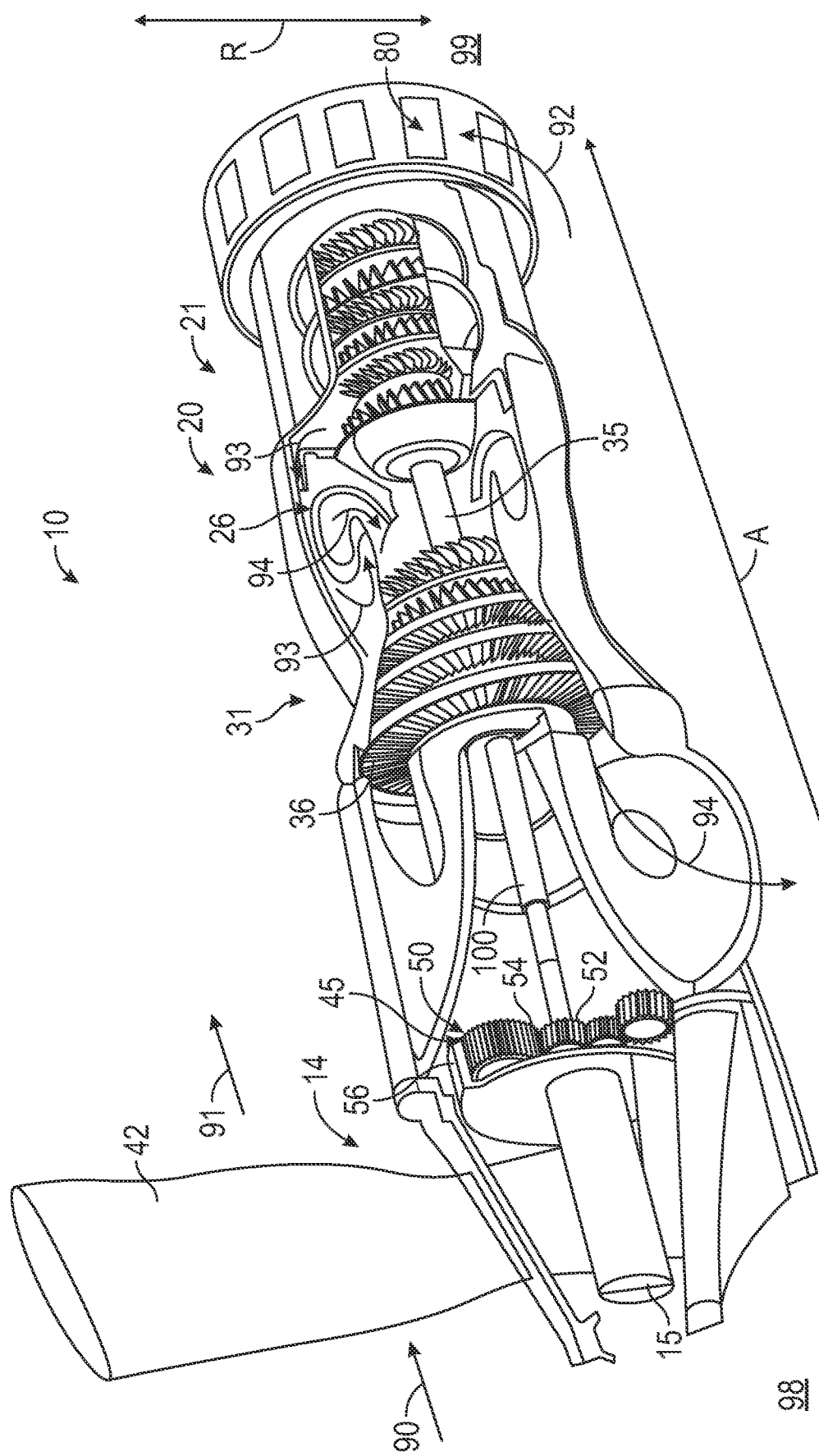
FIG. 2 illustrates a system of connecting a gearbox to an engine core in a turbine engine according to another embodiment of the present disclosure.

Referring now to the drawings, FIGS. 1 and 2 illustrate various views of a gas turbine engine 10 (herein referred to as "engine 10") according to an embodiment of the present disclosure. As shown in FIG. 1, the engine 10 is shown as a high bypass turbofan engine, incorporating an exemplary embodiment of a flexible coupling shaft 100 according to an aspect of the present disclosure. In FIG. 2, the engine 10 is shown as a turboprop engine incorporating an exemplary embodiment of the flexible coupling shaft 100 according to an aspect of the present disclosure. Although further described below with reference to a turbofan engine and/or a turboprop engine, the present disclosure is also applicable to wind turbines and turbo-machinery in general, including, e.g., propfan gas turbine engines, turbojet gas turbine engines, and turboshaft gas turbine engines, including marine turbine engines and industrial turbine engines and auxiliary power units. As shown in FIG. 1, the engine 10 has an axial centerline axis 12 that extends therethrough for reference purposes. As shown in FIGS. 1 and 2, the engine 10 further defines an axial direction A, a radial direction R, a forward end 98, and an aft end 99 along the axial direction A.

According to one embodiment, the engine 10 may include an engine core 20 and a fan/propeller assembly 14. The engine core 20 may generally include, in serial flow arrangement, a compressor section 21, a combustion section 26, and a turbine section 31. The compressor section 21 may define one or more compressors, such as, e.g., a high pressure compressor (HPC) 24 and a low pressure compressor (LPC) 22. The turbine section 31 may define one or more turbines, such as, e.g., a high pressure turbine (HPT) 28 and a low pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

The low pressure compressor (LPC) 22 and the high pressure compressor (HPC) 24 in the compressor section 21 and the high pressure turbine (HPT) 28 and the low pressure turbine (LPT) 30 in the turbine section 31 may each include one or more rotors 32. In one embodiment, the rotors 32 include one or more shafts 35 of the engine 10 connecting the compressor section 21 to the turbine section 31. In other embodiments, the rotors 32 generally define a disk 33 extended at least partially in the radial direction R and a plurality of airfoils 36 connected in circumferentially adjacent arrangement and extended outward in the radial direction R from the disk 33. In one embodiment, the one or more rotors 32 may each be connected together. For example, each rotor 32 of the turbine section 31 or the compressor section 21 may be connected by mechanical fasteners, such as, e.g., bolts, nuts, screws, and/or rivets, or by a bonding process, such as, e.g., welding, friction bonding, diffusion bonding, etc. In various embodiments, one or more compressors of the compressor section 21 may be drivingly connected and rotatable with one or more turbines of the turbine section 31 by way of the one or more shafts 35.

The fan/propeller assembly 14 generally includes a fan rotor/propeller shaft 15. The fan rotor/propeller shaft 15 includes a plurality of fan/propeller blades 42 that are coupled to and extend outwardly from the fan rotor/propeller shaft 15 in the radial direction R. In the embodiments shown in FIGS. 1 and 2, the fan rotor/propeller shaft 15 may extend in the axial direction A toward the forward end 98 from a reduction gearbox or a power gearbox 45 (herein referred to as "gearbox 45"). The fan/propeller assembly 14 further includes the flexible coupling shaft 100 coupled to the gearbox 45 and extended toward the aft end 99 and coupled to the engine core 20.

In one embodiment, the gearbox 45 may include an epicyclical gear train 50 including a sun gear 52 and a plurality of planet gears 54. The sun gear 52 is axially installed onto and concentric to the flexible coupling shaft 100, such that the sun gear 52 is attached to, or integral to, the flexible coupling shaft 100. The plurality of planet gears 54 are installed onto the sun gear 52, with the plurality of planet gears 54 being supported by various bearings for rotation (e.g., rollers, balls, or other bearing types, e.g., journal bearing). The plurality of planet gears 54 may each be fixed such that each planet gear 54 rotates on a fixed axis relative to the sun gear 52. A ring gear 56 (or annular gear) engages with the plurality of planet gears 54 and surrounds the plurality of planet gears 54. The ring gear 56 further connects to an output element to allow for rotation and transfer of power and torque from the sun gear 52 through the plurality of planet gears 54. According to one embodiment, the ring gear 56 may be coupled to or otherwise integral with an output element in the form of, e.g., a fan rotor or propeller shaft (see, e.g., the fan rotor/propeller shaft 15 of FIGS. 1 and 2). In various embodiments, the gearbox 45 may further include additional planet gears disposed radially between the plurality of planet gears 54 and the sun gear 52, or between the plurality of planet gears 54 and the ring gear 56.

As further shown in FIGS. 1 and 2, the flexible coupling shaft 100 is connected to the engine core 20 to transmit torque and power through the sun gear 52 to the gearbox 45 to the fan rotor/propeller shaft 15. The fan rotor/propeller shaft 15 may be connected to the surrounding ring gear 56 (or annular gear) or the planet gears 54 to receive torque from the sun gear 52 and to transfer torque to drive the fan/propeller assembly 14. As power and torque are transmitted from the engine core 20, the gearbox 45 provides power and torque at an output speed to the fan rotor/propeller shaft 15 that is more suitably adjusted for the fan/propeller assembly 14. For example, the gearbox 45 may reduce fan rotor/propeller shaft 15 speed relative to the engine core 20 by a factor of two or more. According to one embodiment, the gearbox 45 reduces the rotational speed from the engine core 20 (e.g., the compressor section 21 or the turbine section 31) and provides a desired amount of torque and rotational speed to the fan/propeller assembly 14.

During operation of the engine 10, as shown and described in regard to FIGS. 1 and 2 collectively, a volume of air as indicated schematically by arrow 90 enters the engine 10. As the air 90 passes across the fan/propeller blades 42, a portion of the air as indicated schematically by arrow 91 is directed or routed outside of the engine core 20 to provide propulsion. Additionally, another portion of air as indicated schematically by arrow 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and to support operation of respectively coupled rotary members in the compressor section 21 and/or the fan/propeller assembly 14. For example, the HPC 24 and the HPT 28 may be coupled and rotatable to drive the engine 10 and to generate combustion gases 94 at the combustion section 26 to drive the LPT 30. The LPT 30 may be connected to the LPC 22.

Figure 3:
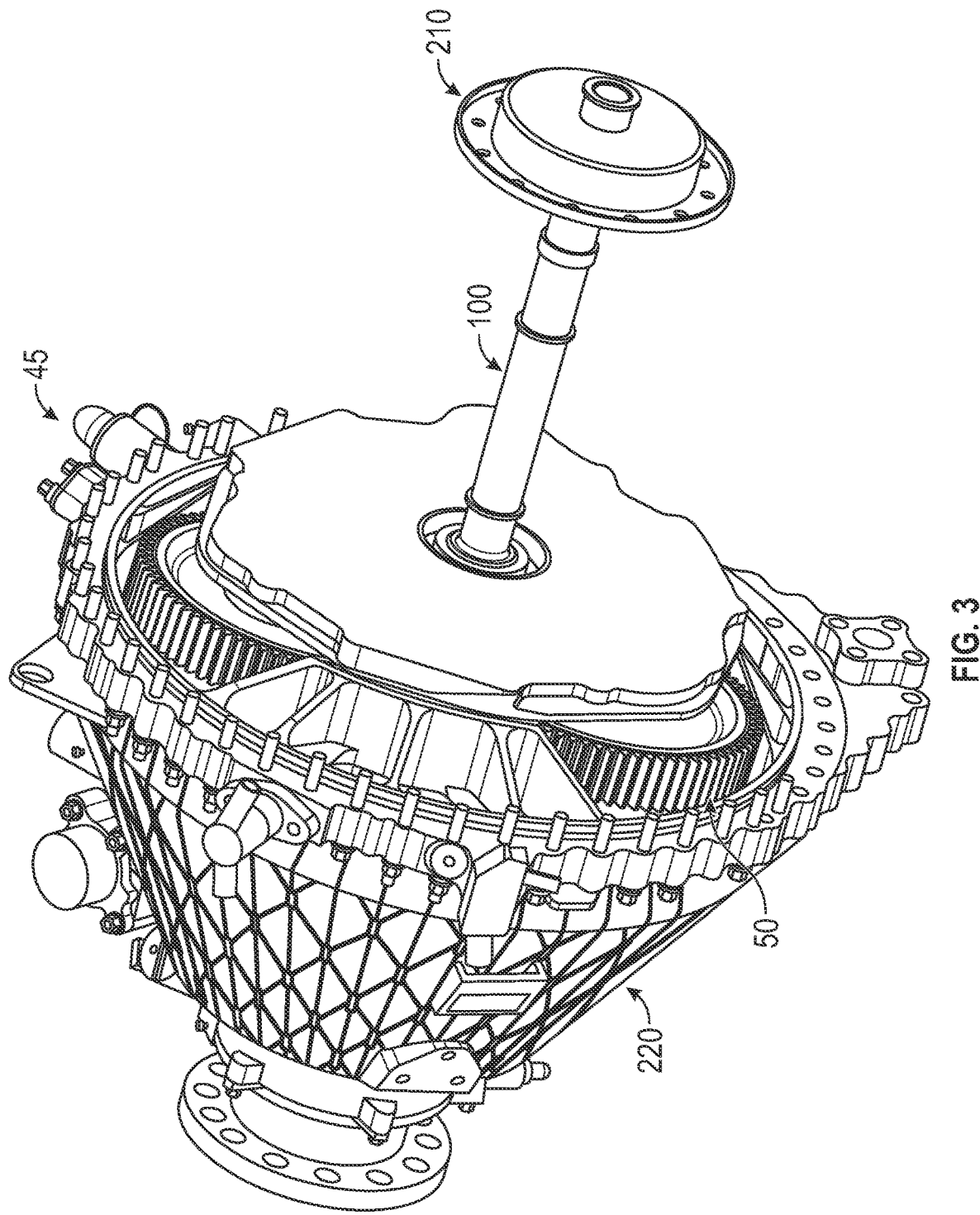
FIG. 3 illustrates a gearbox for connecting to an engine core of a turbine engine according to one embodiment of the present disclosure.

FIG. 3 illustrates an embodiment of the gearbox 45 of FIGS. 1 and 2 for use in a gas turbine engine (see, e.g., engine 10 of FIGS. 1 and 2). The gearbox 45 of FIG. 3 includes the flexible coupling shaft 100 for connecting an engine core (see, e.g., engine core 20 of FIGS. 1 and 2) to the gearbox 45 and/or a fan/propeller assembly (see, e.g., fan/propeller assembly 14 of FIGS. 1 and 2). As shown in FIG. 3, the flexible coupling shaft 100 connects to the engine core, such as, e.g., a power turbine, via a coupling member 210 that interfaces with the engine core. The gearbox 45 includes a housing 220 in which is housed the epicyclical gear train 50, as discussed above, that includes the sun gear and the plurality of planet gears (see also, e.g., FIG. 6E).

Figure 4:
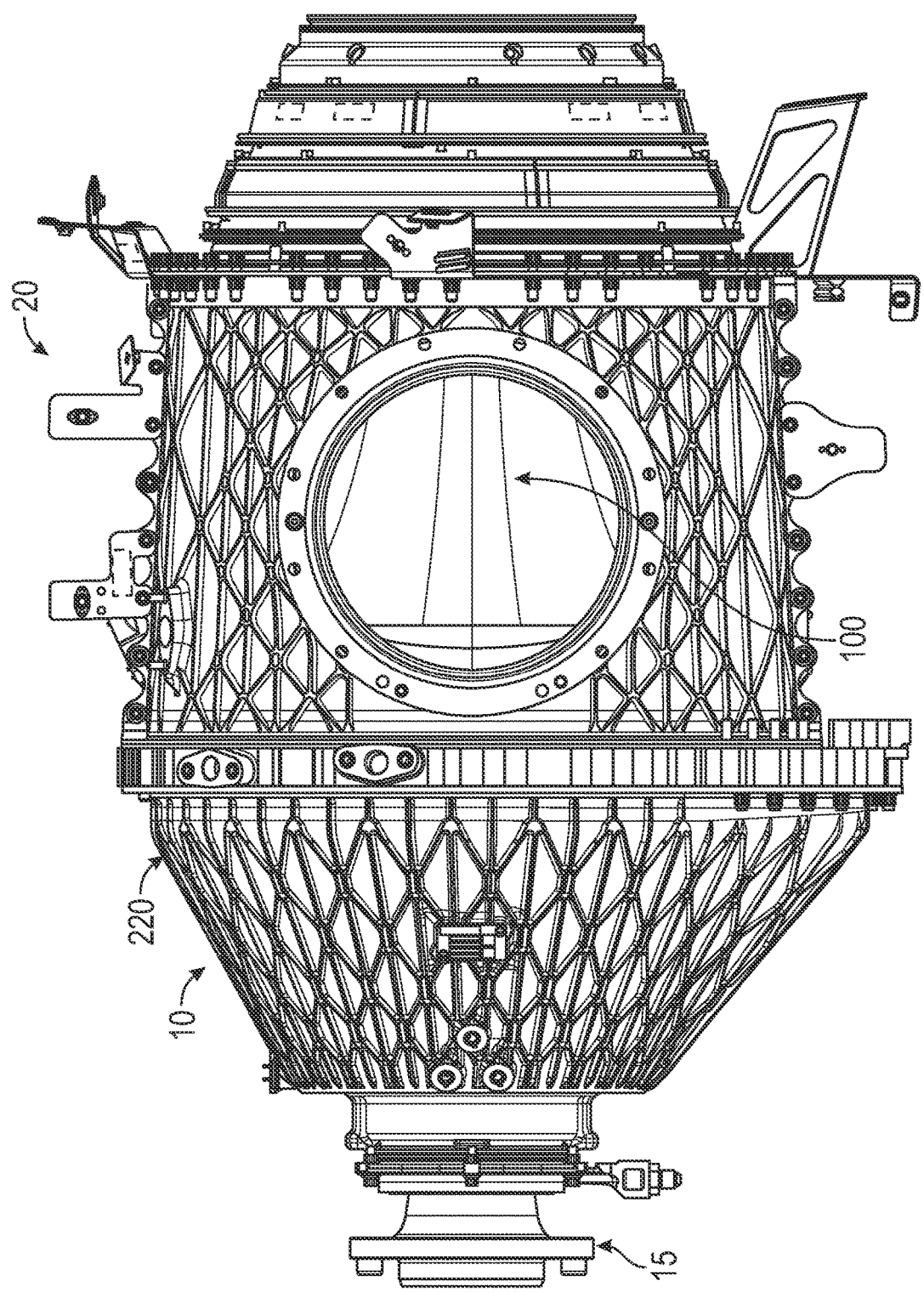
FIG. 4 illustrates a system of connecting a gearbox to an engine core in a turbine engine according to one embodiment of the present disclosure.
Figure 5:
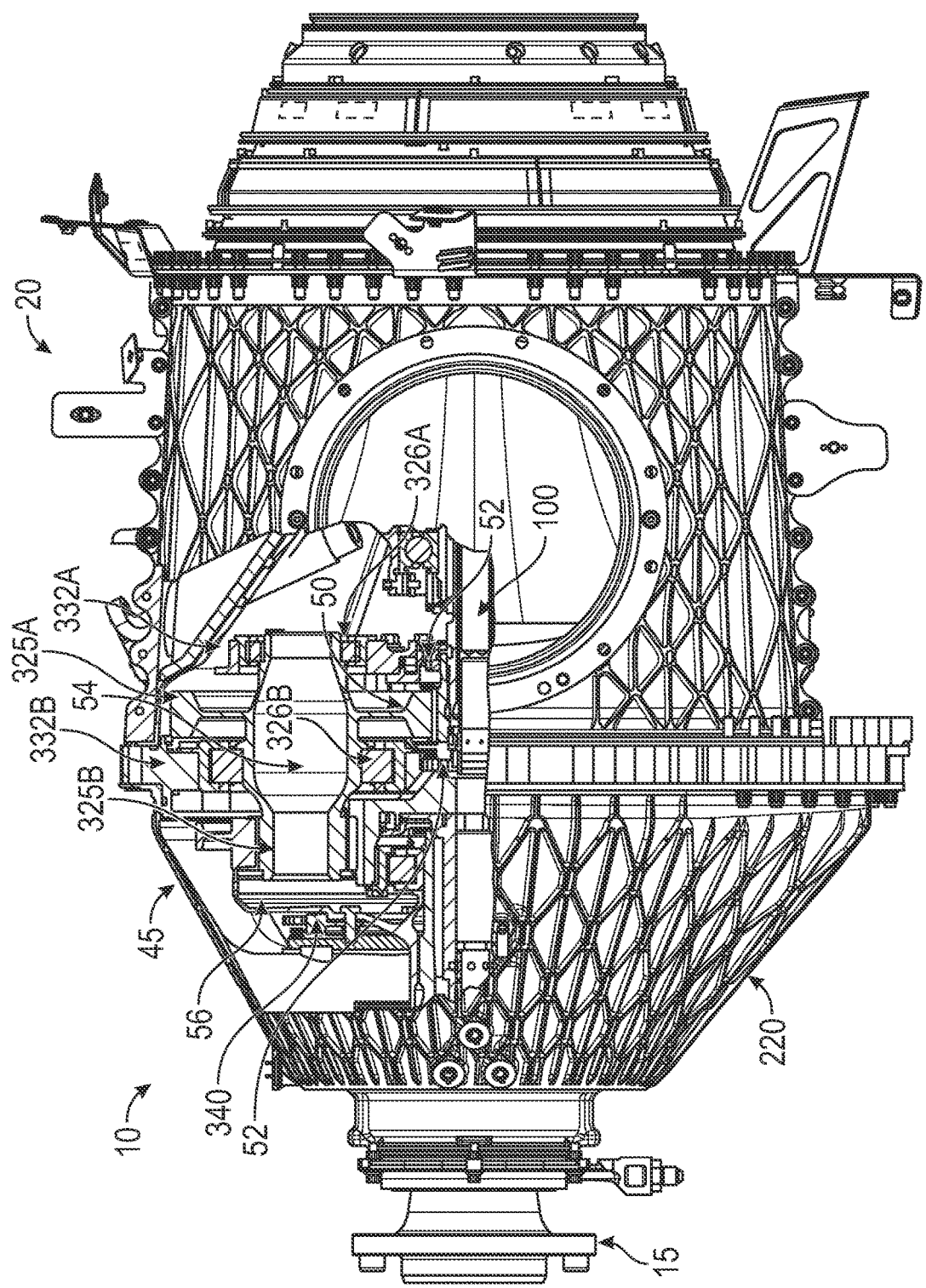
FIG. 5 illustrates the system shown in FIG. 4 having a partial, cut-away, cross-sectional view of the gearbox according to an embodiment of the present disclosure.

FIGS. 4 and 5 illustrate a system or engine 10 connecting the gearbox 45 shown in FIG. 3 to an engine core 20 in a turbine engine according to one embodiment of the present disclosure. As shown in FIGS. 4 and 5, the gearbox 45 includes the flexible coupling shaft 100 for connecting the flexible coupling shaft 100 to the engine core 20, such as, e.g., a power turbine, via a coupling member (see, e.g., coupling member 210 of FIG. 3) that interfaces with the engine core 20.

Within the housing 220 of the gearbox 45, the epicyclical gear train 50 that includes the sun gear 52 and the plurality of planet gears 54 (or layshafts), as discussed above, (see also, e.g., FIG. 6E) is housed. The sun gear 52 of the epicyclical gear train 50 interacts with the flexible coupling shaft 100, while the planet gear(s) 54 interacts with the sun gear 52 (as further described below). The planet gear 54 is further connected to one or more spur gears 325A, 325B on first and second reduction stages. For example, according to one embodiment, the sun gear 52 and a first spur gear 325A on the planet gear 54 comprise gears of a first reduction stage, while a second spur gear 325B on the planet gear 54 and the ring gear 56 comprise gears of a second reduction stage, which allows for a total reduction value of the gearbox 45 to be obtained. The second spur gear 325B is disposed within the ring gear 56 of the epicyclical gear train 50 (as further described below). As further shown in FIG. 5, the gearbox 45 further includes (i) a first stage straddle mounted layshaft (e.g., first spur gear 325A on planet gear 54) having the first spur gear 325A between a pair of rollers 326A and 326B, which is part of the first reduction stage described above, and a second stage outside mounted layshaft (e.g., second spur gear 325B on planet gear 54) having the second spur gear 325B outside of the pair of rollers 326A and 326B, which is part of the second reduction stage described above, and (ii) a two-piece carrier 332A, 332B. In addition, the gearbox 45 includes an additional spur gear 340 connected with the ring gear 56 that can be used to transfer rotation to an external accessory component (not shown), such as, e.g., a pitch control unit (PCU), through a dedicated axis and/or a gearshaft that engages with the additional spur gear 340.

Figures 6A, 6B:
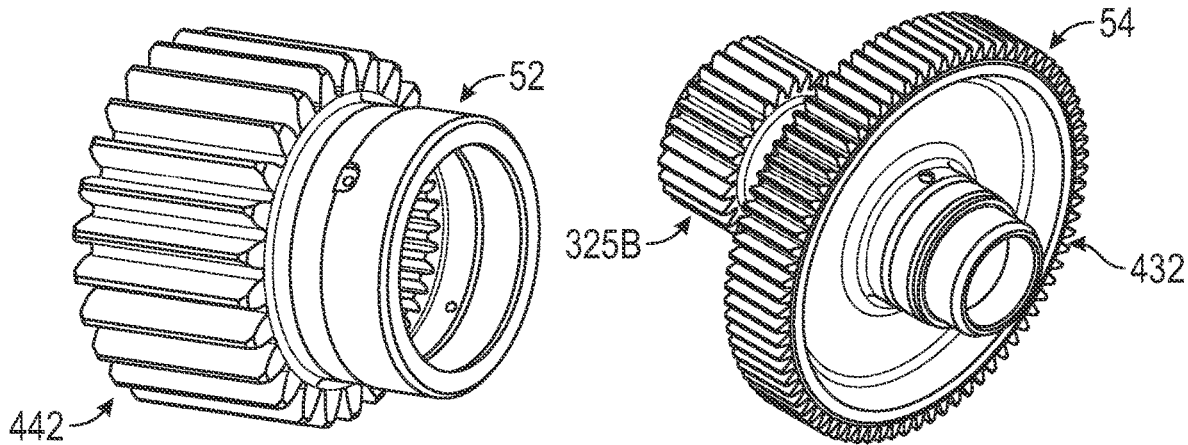
FIGS. 6A to 6E illustrate components of a sun gear system according to an embodiment of the present disclosure.

FIGS. 6A to 6E illustrate the various components of the epicyclical gear train 50 of the gearbox 45 shown in the embodiments of FIGS. 1-5 in further detail. In particular, FIG. 6A illustrates the sun gear 52 of the epicyclical gear train 50. As shown in FIG. 6A, the sun gear 52, which is disposed in the center of the epicyclical gear train 50 (see, e.g., FIG. 6E), includes a set of gears 442 configured to engage with the one or more planet gears 54 (or layshafts).

FIG. 6B illustrates one of the planet gears 54 (or layshafts) of the epicyclical gear train 50 of the gearbox 45 shown in the embodiments of FIGS. 1-5. The planet gear 54 includes a first set of gears 432 that is configured to engage with the set of gears 442 of the sun gear 52 (see, e.g., FIG. 6E). The planet gear 54 further includes the second spur gear 325B that is configured to engage with the ring gear 56 (see, e.g., FIG. 6C).

Figure 6C:
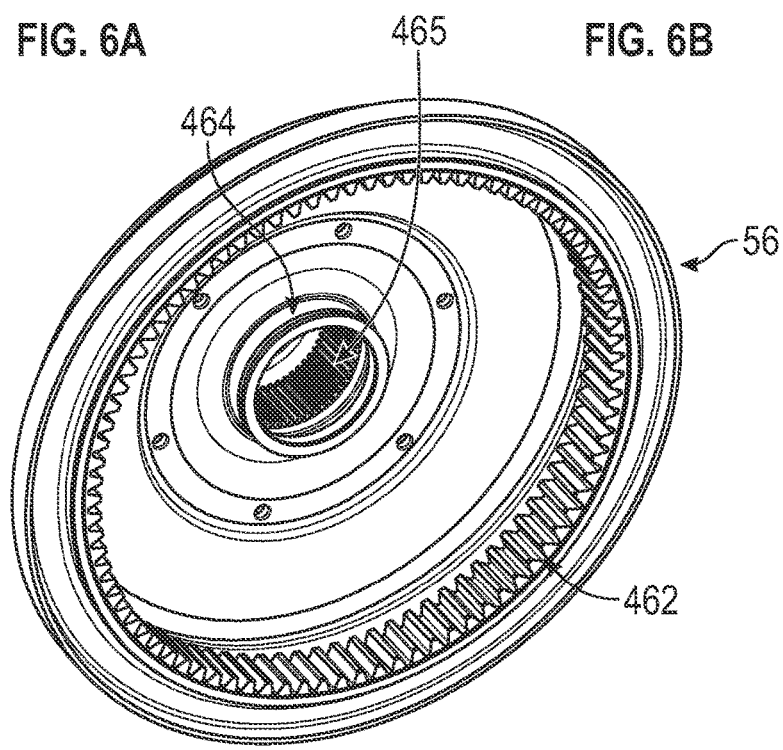

FIG. 6C illustrates the ring gear 56 of the epicyclical gear train 50 of the gearbox 45 shown in the embodiments of FIGS. 1-5. As shown in FIG. 6C, the ring gear 56 includes a first set of gears 462 that is configured to engage with at least the second spur gear 325B of the one or more planet gears 54 (see, e.g., FIG. 6E). The ring gear 56 further includes an opening 464 through which the fan rotor/propeller shaft 15 can extend for engaging the flexible coupling shaft 100 (see, e.g., FIG. 6E). The opening 464 of the ring gear 56 includes a second set of gears 465 configured to engage with a set of gears 484 of the fan rotor/propeller shaft 15 (see, e.g., FIG. 6D).

Figure 6D:
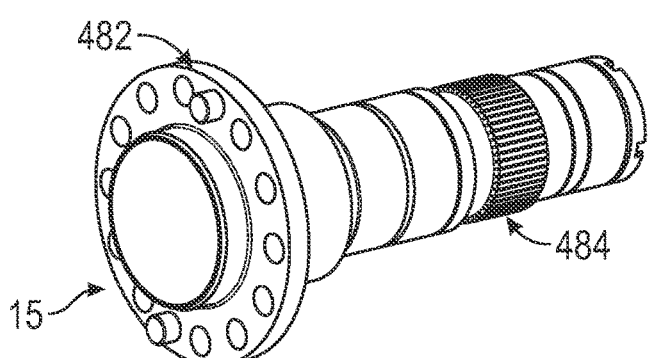

FIG. 6D illustrates the fan rotor/propeller shaft 15 of the epicyclical gear train 50 of the gearbox 45 shown in the embodiments of FIGS. 1-5. As shown in FIG. 6D, the fan rotor/propeller shaft 15 includes a set of gears 484 that is configured to engage with the second set of gears 465 of the ring gear 56 (as discussed above). The fan rotor/propeller shaft 15 further includes a coupling member 482 for connecting the fan rotor/propeller shaft 15 to other components of a fan/propeller assembly (see, e.g., fan/propeller assembly 14 of FIGS. 1 and 2).

Figure 6E:
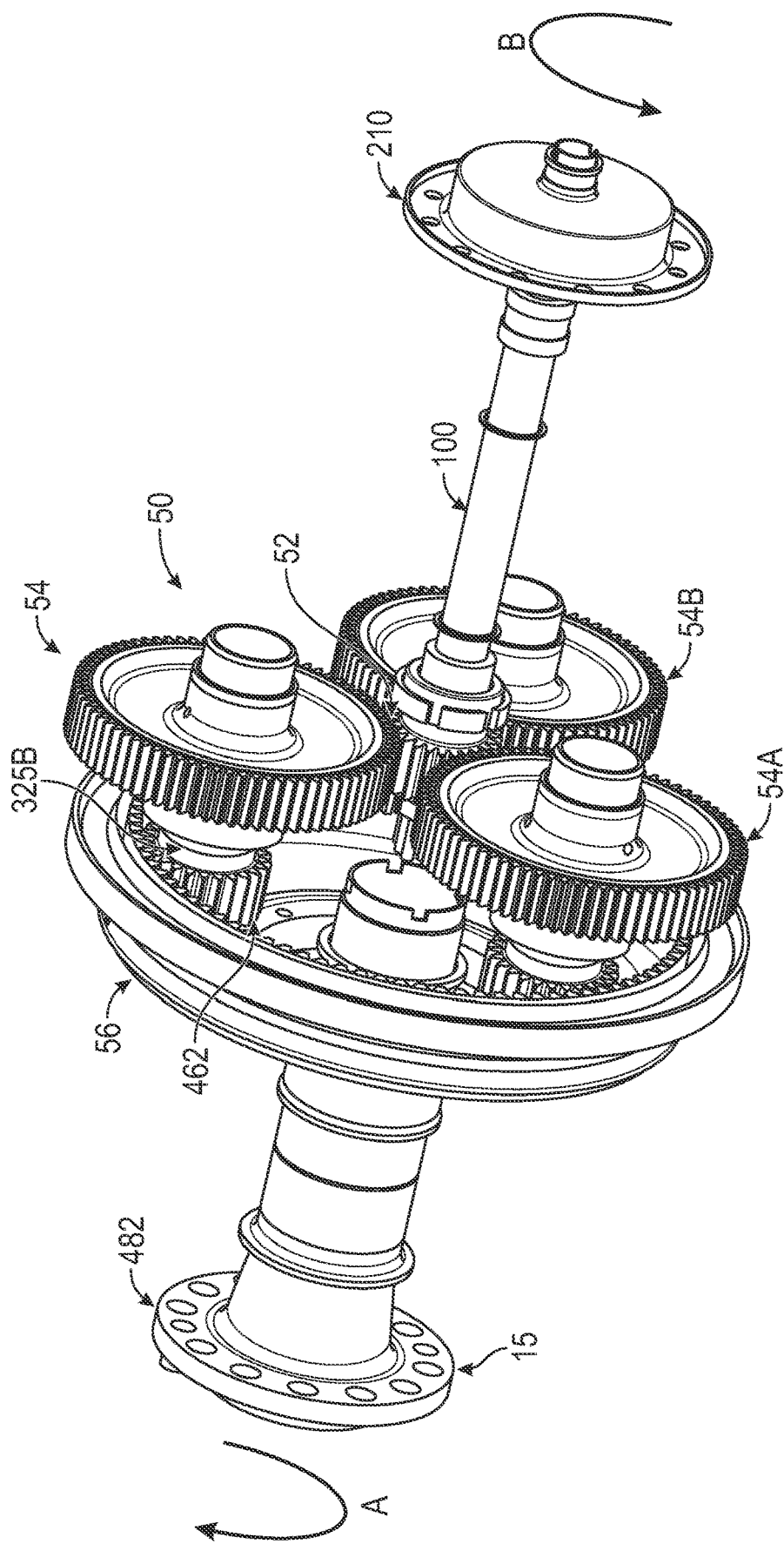

FIG. 6E illustrates the complete epicyclical gear train 50 of the gearbox 45 shown in the embodiments of FIGS. 1-5. As shown in FIG. 6E, the epicyclical gear train 50 includes (i) the sun gear 52 that engages with the flexible coupling shaft 100 via a flexible connection and/or coupling, and (ii) the plurality of planet gears 54, 54A, 54B (or layshafts) that engage with the sun gear 52 via a respective sets of gears (see, e.g., first set of gears 432 of the planet gear 54 in FIG. 6B that is configured to engage with the set of gears 442 of the sun gear 52 of FIG. 6A). Each of the planet gears 54, 54A, 54B includes a second spur gear 325B that is configured to engage with the first set of gears 462 of the ring gear 56. FIG. 6E further illustrates the fan rotor/propeller shaft 15, which extends into the ring gear 56 in order to interact with the flexible coupling shaft 100. As discussed above, the fan rotor/propeller shaft 15 includes a coupling member 482 for connecting the fan rotor/propeller shaft 15 to other components of a fan/propeller assembly (see, e.g., fan/propeller assembly 14 of FIGS. 1 and 2). The flexible coupling shaft 100 also includes the coupling member 210 for connecting the flexible coupling shaft 100 of the gearbox 45 to the engine core 20 via a fixed connection through, for example, mechanical fasteners (see, e.g., FIG. 3).

As further illustrated in the embodiment of FIG. 6E, during operation, the fan rotor/propeller shaft 15 is configured to rotate in a first direction A (e.g., a clockwise direction), while the flexible coupling shaft 100 is configured to rotate in a second direction B (e.g., a counter-clockwise direction). According to one embodiment, the energy or power generated by a turbine of the engine core (see, e.g., turbine section 31 of engine core 20 of FIGS. 1 and 2) is transferred to the flexible coupling shaft 100 via this rotation. However, according to one embodiment, due to high-speed revolutions of the engine system (e.g., the turbine of the engine core), vibrations and/or oscillations occur to the flexible coupling shaft 100, because the flexible coupling shaft 100 generally acts as a cantilever beam due to the flexible connection and/or coupling of the flexible coupling shaft 100 to the sun gear 52 and/or the epicyclical gear train 50. As discussed above, these vibrations and/or oscillations to the flexible coupling shaft 100 cause wear and fretting events to occur to various components of the system. Accordingly, as discussed in more detail below, a damper system (see, e.g., damper system 560 and 560' of FIGS. 8A and 9A), which is disposed at the free end of the flexible coupling shaft 100 (i.e., the end of the flexible coupling shaft 100 that engages with the sun gear 52 of the epicyclical gear train 50 via a flexible connection and/or coupling), is provided to limit shaft vibrations and/or oscillations during a running cycle of the turbine engine.

FIG. 7 illustrates a cross-sectional view of an arrangement in a turbine engine for connecting a gearbox to an engine core with a shaft having a metering tube that includes a damper system 560 according to one embodiment of the present disclosure. As shown in FIG. 7, a portion of a turbine engine 500 includes the flexible coupling shaft 100 connecting the gearbox 45 and the engine core 20. The flexible coupling shaft 100 includes a metering tube 510 within an inner portion of the flexible coupling shaft 100. The metering tube 510 is supported by the flexible coupling shaft 100 via a bushing (see, e.g., cobalt bush 520 of FIG. 8A). The metering tube 510 defines (i) a first end 511 near an aft end 599 of the turbine engine 500 and (ii) a second end 512 near a forward end 598 of the turbine engine 500, along the axial direction A, in which the first end 511 is proximate to the engine core 20 and the second end 512 is proximate to the sun gear 52 of the gearbox 45 and/or a fan/propeller assembly 514. The flexible coupling shaft 100 and/or the metering tube 510 is connected (i) at the first end 511 via a fixed (or immovable) connection to the engine core 20 and (ii) at the second end 512 via a flexible (or movable) connection or coupling to the sun gear 52 of the gearbox 45 (as discussed above). For example, as shown in the embodiment of FIG. 7, the flexible coupling shaft 100 can include a coupling 518 extended at least partially in the radial direction R coupled to the engine core 20. In one embodiment, the coupling 518 defines one or more fastening locations 524 at which one or more rotors 532 of the engine core 20 and the coupling 518 attach in an axially adjacent arrangement. In another embodiment, the coupling 518 defines a plurality of orifices 522 through which one or more fasteners 523 may extend into the rotor 532 of the engine core 20. The plurality of orifices 522 may extend generally in the axial direction A through the coupling 518 and the rotor 532. In various embodiments, the one or more fasteners 523 and/or fastening locations 524 may include mechanical fasteners, such as, but not limited to, bolts, nuts, screws, and/or rivets, and/or fastening or joining processes, such as welding or bonding processes, including, but not limited to, friction welding or diffusion bonding, or combinations thereof.

As further shown in FIG. 7, the rotor 532 may define an annular hub 534 extended in the axial direction A from a disk 533 of the rotor 532. The annular hub 534 of the rotor 532 may extend generally in the axial direction A toward the gearbox 45. In one embodiment, the turbine engine 500 further includes one or more bearings 515A, 515B coupled to the hub 534 of the rotor 532. In one embodiment, as shown in FIG. 7, the one or more bearings 515A, 515B is coupled to the hub 534 of the rotor 532 from which the flexible coupling shaft 100 extends toward the gearbox 45. The one or more bearings 515A, 515B may be disposed between the first end 511 and the second end 512 of the flexible coupling shaft 100 and/or the metering tube 510. The bearing(s) 515A, 515B may further be coupled to one or more static frame(s) 562 configured to dispose the one or more rotors 532 co-axially to along the axial direction A.

FIG. 7 further illustrates the flexible coupling shaft 100 and/or the metering tube 510 extending from the rotor 532 to the sun gear 52 of the gearbox 45 in the axial direction A and inward of the hub 534 in the radial direction R. The flexible coupling shaft 100 may define one or more platforms 505 extended at least partially in the radial direction R and adjacent to an inner diameter of the hub 534 of the rotor 532 defining the disk 533. The one or more platforms 505 may further extend at least partially in the axial direction A. The one or more platforms 505 may define a clearance fit between the platform 505 and the hub 534 such as to at least partially retain the flexible coupling shaft 100 relative to the rotor 532. Disposed at the second end 512 of the flexible coupling shaft 100 and/or the metering tube 510 is a damper system 560 according to one embodiment of the present disclosure. The damper system 560 comprises an oil dumping system that is configured to limit the vibrations and/or oscillations of the metering tube 510 and/or its associated flexible coupling shaft 100 during a running cycle of the turbine engine 500. The damper system 560 (e.g., oil dumping system) uses an amount of pressurized oil that is provided to the damper system 560 through a channel 570 and an oil space 575 that is created in an area above the sun gear 52 and/or the gearbox 45. The pressurized oil provided to the damper system 560 permits misalignments of the metering tube 510 and/or its associated flexible coupling shaft 100 and decreases vibrations and/or oscillations during rotation of the flexible coupling shaft 100.

FIGS. 8A and 8B illustrate enlarged, partial cross-sectional views of the damper system 560 shown in FIG. 7 according to one embodiment of the present disclosure. As shown in FIGS. 8A and 8B, the damper system 560, which is disposed at the second end 512 (or free end) of the flexible coupling shaft 100 and/or the metering tube 510, comprises a ball bearing 600 (or roller bearing) that includes a ball 610 (or roller) positioned between an inner ring 615A (or inner race) and an outer ring 615B (or outer race). As discussed above, pressurized oil (P) is provided to the damper system 560 from an oil space 575 to a channel 570 that is created in an area above the sun gear 52 and/or the flexible coupling shaft 100 or the metering tube 510. The pressurized oil (P) travels to a circumferential oil pressure room 620 created around the outer ring 615B of the ball bearing 600 and/or added on top of the ball bearing 600. According to one embodiment, a thickness of the outer ring 615B of the ball bearing 600 allows for a controlled oil leakage (L) to the ball bearing 600 and/or the damper system 560. According to another embodiment, oil is further provided to the area around the second end 512 (or free end) of the metering tube 510 via an oil distribution channel or external oil jet 640. As discussed above, the damper system 560 (e.g., oil dumping system) ensures flexibility of the metering tube 510 and/or its associated flexible coupling shaft 100 in the sun gear configuration (see, e.g., FIG. 6E), while also reducing vibrations to the metering tube 510 and/or its associated flexible coupling shaft 100 from the engine in the sun gear configuration (see, e.g., FIG. 6E). According to one embodiment, the metering tube 510 receives the vibrations from the flexible coupling shaft 100 through a bushing (e.g., cobalt bush 520) on which the metering tube 510 is supported by the flexible coupling shaft 100. As shown in the embodiment of FIG. 8A, the damper system 560 is positioned on the metering tube 510 and the damper effect (i.e., reduction in vibrations) can be returned to the flexible coupling shaft 100 through the bushing (e.g., cobalt bush 520).

FIGS. 9A and 9B illustrate enlarged, partial cross-sectional views of a damper system 560' according to another embodiment of the present disclosure. As shown in FIGS. 9A and 9B, the damper system 560', which is disposed at the second end 512 (or free end) of the flexible coupling shaft 100 and/or the metering tube 510, comprises a journal bearing in the form of an oil distributor 700. As discussed above, pressurized oil (P) is provided to the damper system 560' from an oil space 575 to a channel 570 that is created in an area above the sun gear 52 and/or the flexible coupling shaft 100 or the metering tube 510. The pressurized oil (P) travels to a circumferential oil pressure room 720 (or channel) created in an area between the oil distributor 700 and an outer static support 705. According to one embodiment, the oil distributor 700 (or journal bearing) is configured to keep pressurized oil within the circumferential oil pressure room 720. As discussed above, the damper system 560' (e.g., oil dumping system) ensures flexibility of the metering tube 510 and/or its associated flexible coupling shaft 100 in the sun gear configuration (see, e.g., FIG. 6E), while also reducing vibrations to the metering tube 510 and/or its associated flexible coupling shaft 100 from the engine in the sun gear configuration (see, e.g., FIG. 6E).

Figure 10A:
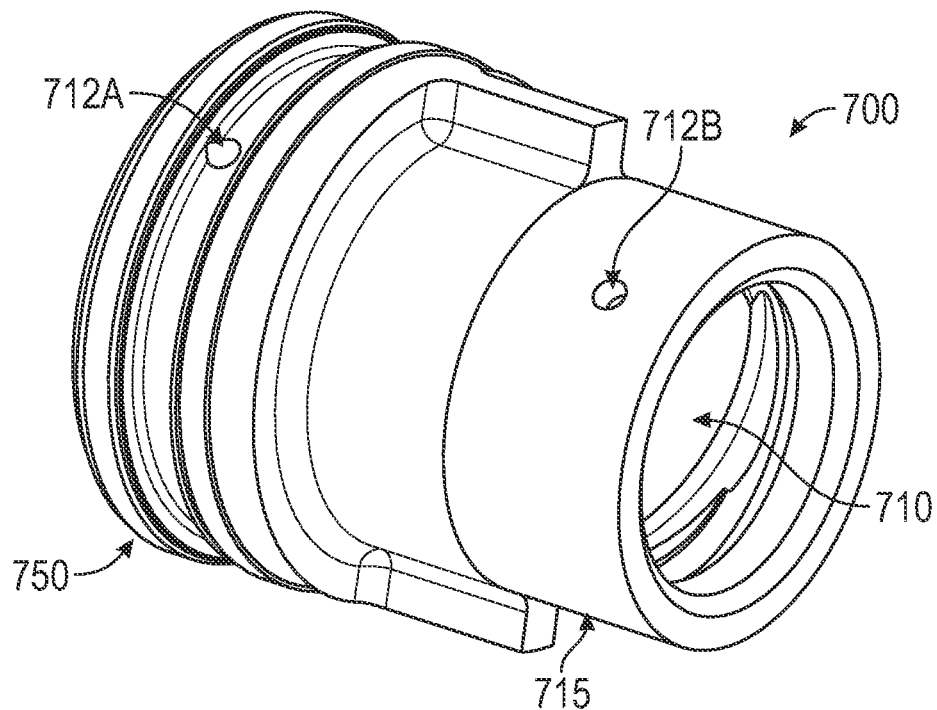
FIG. 10A illustrates an oil distributor for use in a damper system according to an embodiment of the present disclosure.
Figure 10B:
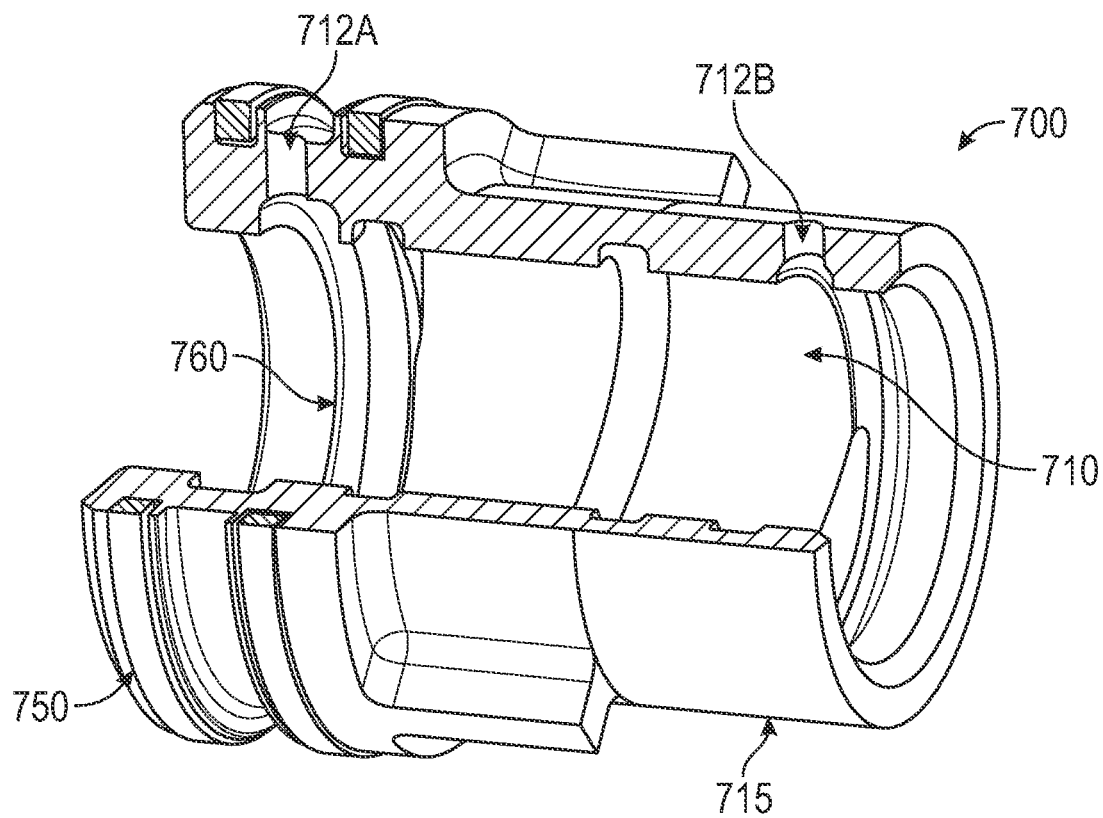
FIG. 10B illustrates a partial cutaway view of the oil distributor shown in FIG. 10A according to one embodiment of the present disclosure.

FIGS. 10A and 10B illustrate the oil distributor 700 of the damper system 560' of FIGS. 9A and 9B, with FIG. 10B illustrating a partial cutaway view of the oil distributor 700 shown in FIG. 10A, according to an embodiment of the present disclosure. As shown in FIGS. 10A and 10B, the oil distributor 700 comprises an outer housing 715 and an inner bush 710 configured to receive the flexible coupling shaft and/or the metering tube (e.g., metering tube 510). The oil distributor 700 further includes (i) one or more piston rings 750 and (ii) an inner oil distribution portion 760 (or helical groove) having radial holes 712A, 712B configured to supply oil to the inner bush 710 and, thereby, the flexible coupling shaft and/or the metering tube (e.g., metering tube 510). According to one embodiment, the one or more piston rings 750 is a static part(s), while the oil distributor 700 is configured to rotate at an engine speed frequency. According to the embodiment of FIGS. 10A and 10B, an alternative solution is provided for distributing oil to the flexible coupling shaft and/or the metering tube (e.g., metering tube 510), as opposed to an external oil jet provided at the end of the flexible coupling shaft and/or the metering tube (e.g., metering tube 510) (see, e.g., external oil jet 640 of FIG. 8A). According to an embodiment, pressurized oil (P) travels from an oil space (see, e.g., oil space 575 of FIG. 9A) to a channel (see, e.g., channel 570 of FIGS. 9A and 9B) and thereafter, to a circumferential oil pressure room or channel (see, e.g., circumferential oil pressure room 720 of FIGS. 9A and 9B) to thereby activate the one or more piston rings 750.

Figure 11:
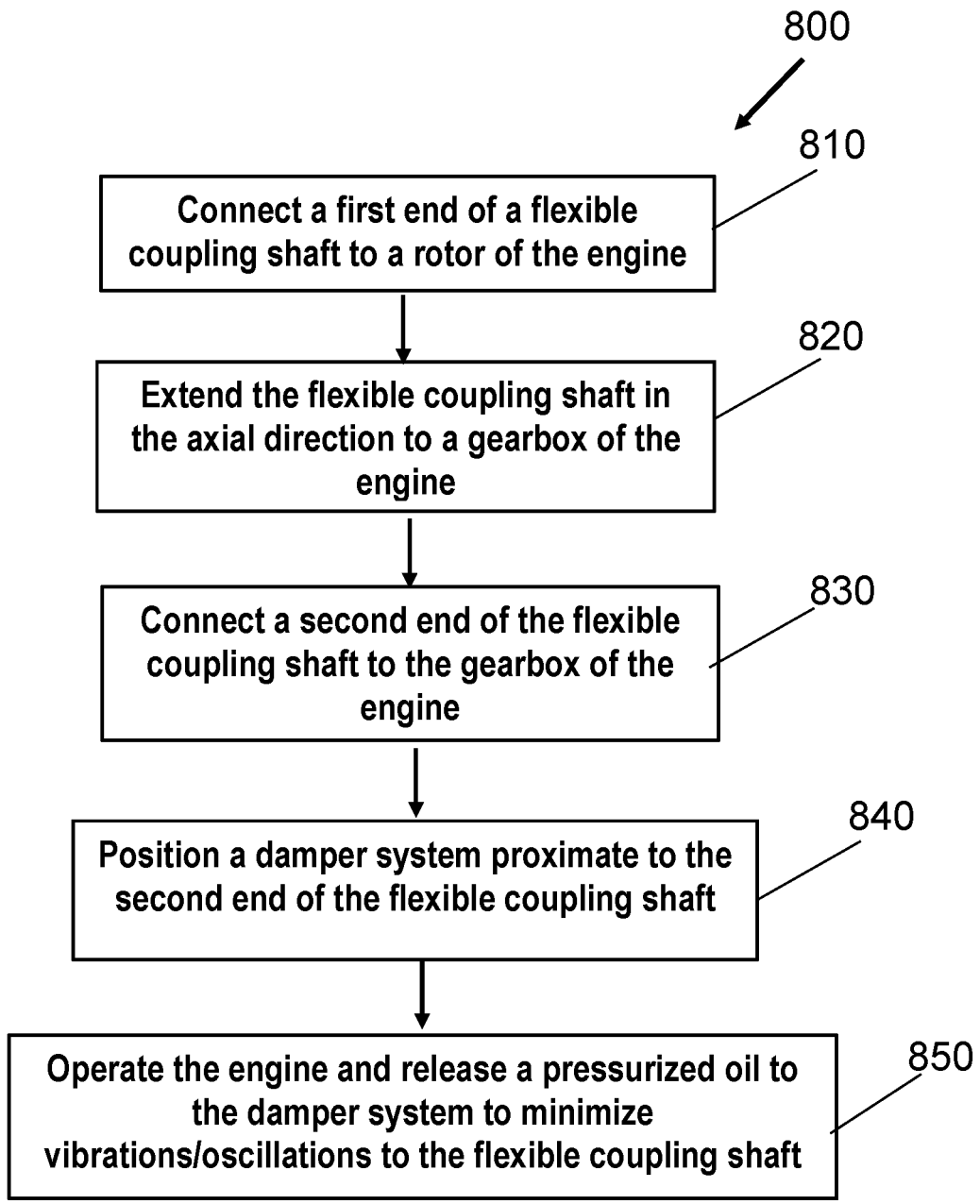
FIG. 11 is a flowchart outlining a method of connecting a gearbox to an engine core according to an embodiment of the present disclosure.

FIG. 11 illustrates a flowchart outlining steps of an exemplary method of connecting a turbine engine gearbox and an engine core (herein referred to as "method 800"). The method 800 may remove, minimize, and/or limit vibrations and/or oscillations that can occur to the flexible coupling shaft during a running cycle of the engine. FIG. 11 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 800 may utilize a turbine engine (such as, e.g., engine 10 and 500 shown in FIGS. 1, 2, 4, 5, and 7 and described herein). The method 800 may include, at step 810, connecting a first end of a flexible coupling shaft to a rotor of the turbine engine, at step 820, extending the flexible coupling shaft in the axial direction to a gearbox of the turbine engine, and, at step 830, connecting a second end of the flexible coupling shaft to the gearbox of the turbine engine. The method 800 may further include, at step 840, positioning a damper system proximate to the second end of the flexible coupling shaft and/or a metering tube. In one embodiment, such as shown in FIGS. 7 to 8B, the damper system 560 can be in the form of a ball bearing 600. According to another embodiment, such as shown in FIGS. 9A to 9B, the damper system 560' can be in the form of an oil distributor 700 (or journal bearing). The method 800 may further include, at step 850, operating the engine and releasing pressurized oil to the damper system to minimize vibrations and/or oscillations to the flexible coupling shaft and/or the metering tube.

The systems and methods shown in FIGS. 1 to 11 and described herein may remove, minimize, and/or limit vibrations and/or oscillations that can occur to the flexible coupling shaft during a running cycle of the engine. Furthermore, the systems and methods described herein provide a damper system that permits misalignments and/or flexibility of a flexible coupling shaft, while decreasing vibrations and/or oscillations during rotation of the flexible coupling shaft.

The flexible coupling shaft (100) and other parts, components, or assemblies of the engines (10, 500) shown and described in regard to at FIGS. 1 to 10B may be formed of metals appropriate for turbine engines including, but not limited to, iron-based, titanium-based, nickel-based, or cobalt-based alloys, each of which may include chromium, cobalt, tungsten, tantalum, molybdenum, and/or rhenium. The flexible coupling shaft (100) may be formed using casting, forging, machining, or combinations thereof. Additionally, or alternatively, the flexible coupling shaft (100) may be formed as a single unitary structure or an assembly of several components joined by one or more mechanical fasteners or joining processes, or combinations thereof.

Thus, in accordance with the principles of the disclosure, a damper system and/or a dumping oil system is provided to limit vibrations in a flexible coupling shaft or an engine shaft with a lubrication requirement.

In accordance with the principles of the disclosure, oil pressure provided by a damper system limits oscillation of a flexible coupling shaft or an engine shaft during high-speed revolution and further limits vibration on at least one bush surface used to support rotation of the flexible coupling shaft or engine shaft, which, thereby, avoids fretting issues.

In accordance with the principles of the disclosure, a damper system and/or a dumping system is designed through a dedicated pressurized oil volume at the end of a flexible coupling shaft or an engine shaft.

According to one embodiment of the present disclosure, to permit rotation of a flexible coupling shaft or an engine shaft, different arrangements can be proposed for a damper system, including, e.g., a journal bearing (or oil distributor) and/or a single ball bearing.

According to one embodiment of the present disclosure, active dumping action of oil to a flexible coupling shaft via a damper system can be proportional to oil pressure and oil volume.

In accordance with the principles of the disclosure, a high-speed shaft can be supported with an overhanging damper system that limits (i) high frequency vibration of the high-speed shaft and/or (ii) fretting issue limits on shaft components used to support the shaft, while increasing life limits of the shaft and/or shaft components.

In accordance with the principles of the disclosure, a damper system is provided that allows for use of various types of bush material, including downgrading the types of the bush material, for minor wear propriety requirements, which saves costs in assembly and materials.

Further aspects of the present disclosure are provided by the subject matter of the following clauses.

An engine assembly defining an axial direction, the engine assembly comprising a gearbox, an engine core comprising at least one rotor, a flexible coupling shaft having a first end and a second end along the axial direction, wherein the first end of the flexible coupling shaft is connected to the engine core and the second end of the flexible coupling shaft is connected to the gearbox, and a damper system positioned at the second end of the flexible coupling shaft, wherein the damper system is configured to reduce vibrations to the flexible coupling shaft during operation of the engine assembly.

The engine assembly of any preceding clause, further comprising an external oil jet configured to provide oil to an area around the second end of the flexible coupling shaft.

The engine assembly of any preceding clause, further comprising a channel and an oil space configured to distribute pressurized oil to the damper system.

The engine assembly of any preceding clause, further comprising a circumferential oil pressure room connected to the channel and configured to receive the pressurized oil.

The engine assembly of any preceding clause, wherein the damper system comprises a ball bearing configured to provide the pressurized oil to the flexible coupling shaft.

The engine assembly of any preceding clause, wherein the ball bearing comprises a ball positioned between an outer ring and an inner ring, such that the circumferential oil pressure room is created around the outer ring of the ball bearing.

The engine assembly of any preceding clause, wherein the damper system comprises a journal bearing that defines an oil distributor configured to provide the pressurized oil to the flexible coupling shaft.

The engine assembly of any preceding clause, wherein the oil distributor comprises an outer housing and an inner bush configured to receive the flexible coupling shaft.

The engine assembly of any preceding clause, wherein the oil distributor further comprises an inner oil distribution portion having radial holes configured to supply the pressurized oil to the inner bush.

The engine assembly of any preceding clause, further comprising an epicyclical gear train disposed within the gearbox, the epicyclical gear train being configured to connect the flexible coupling shaft to the gearbox.

The engine assembly of any preceding clause, further comprising a propeller assembly having a propeller shaft that is configured to engage with the epicyclical gear train, wherein the engine core generates energy that is transferred to the propeller shaft.

The engine assembly of any preceding clause, wherein the epicyclical gear train comprises a sun gear and one or more planet gears configured to engage with the sun gear.

The engine assembly of any preceding clause, wherein each planet gear of the one or more planet gears includes a spur gear, and wherein the epicyclical gear train further comprises a ring gear that is configured to engage with each spur gear of each planet gear of the one or more planet gears.

The engine assembly of any preceding clause, wherein the flexible coupling shaft is configured to engage with the sun gear of the epicyclical gear train.

The engine assembly of any preceding clause, wherein the flexible coupling shaft is coupled to the sun gear of the epicyclical gear train via a flexible connection.

The engine assembly of any preceding clause, wherein the flexible coupling shaft is connected to the engine core via a fixed connection.

A method of arranging an engine assembly that defines an axial direction and includes (i) an engine core having at least one rotor and (ii) a gearbox, the method comprising connecting a first end of a flexible coupling shaft to the at least one rotor of the engine core, extending the flexible coupling shaft in the axial direction to the gearbox, connecting a second end of the flexible coupling shaft to the gearbox, and positioning a damper system proximate to the second end of the flexible coupling shaft, wherein the damper system is configured to reduce vibrations to the flexible coupling shaft during operation of the engine assembly.

The method of any preceding clause, further comprising: operating the engine assembly, and releasing pressurized oil to the damper system to reduce the vibrations to the flexible coupling shaft during the operation of the engine assembly.

The method of any preceding clause, wherein the damper system comprises at least one of a ball bearing or a roller bearing configured to provide the pressurized oil to the flexible coupling shaft.

The method of any preceding clause, wherein the damper system comprises a journal bearing that defines an oil distributor configured to provide the pressurized oil to the flexible coupling shaft.

The method of any preceding clause, wherein the gearbox includes an epicyclical gear train, the epicyclical gear train being configured to connect the flexible coupling shaft to the gearbox.

The method of any preceding clause, wherein the engine assembly further includes a propeller assembly having a propeller shaft that is configured to engage with the epicyclical gear train, wherein the engine core generates energy that is transferred to the propeller shaft.

The method of any preceding clause, wherein the epicyclical gear train comprises a sun gear and one or more planet gears configured to engage with the sun gear.

The method of any preceding clause, wherein the second end of the flexible coupling shaft is connected to the sun gear of the epicyclical gear train of the gearbox via a flexible connection.

The method of any preceding clause, wherein the first end of the flexible coupling shaft is connected to the at least one rotor of the engine core via a fixed connection.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. An engine assembly defining an axial direction (A), the engine assembly comprising:
 a gearbox;
 an engine core comprising at least one rotor;
 a flexible coupling shaft having a first end and a second end along the axial direction (A), wherein the first end of the flexible coupling shaft is connected to the engine core and the second end of the flexible coupling shaft is connected to the gearbox;
 a damper system positioned at the second end of the flexible coupling shaft, wherein the damper system is configured to reduce vibrations to the flexible coupling shaft during operation of the engine assembly; and
 (i) a channel and an oil space configured to distribute pressurized oil (P) to the damper system, and (ii) a circumferential oil-filled oil pressure room connected to the channel and configured to receive the pressurized oil (P).

2. The engine assembly of claim 1, further comprising an external oil jet configured to provide oil to an area around the second end of the flexible coupling shaft.

3. The engine assembly of claim 1, wherein the damper system comprises a ball bearing configured to provide the pressurized oil (P) to the flexible coupling shaft.

4. The engine assembly of claim 3, wherein the ball bearing comprises a ball positioned between an outer ring and an inner ring, such that the circumferential oil-filled oil pressure room is created around the outer ring of the ball bearing.

5. The engine assembly of claim 1, wherein the damper system comprises a journal bearing that defines an oil distributor configured to provide the pressurized oil (P) to the flexible coupling shaft.

6. The engine assembly of claim 5, wherein the oil distributor comprises an outer housing and an inner bush configured to receive the flexible coupling shaft.

7. The engine assembly of claim 6, wherein the oil distributor further comprises an inner oil distribution portion having radial holes configured to supply the pressurized oil (P) to the inner bush.

8. The engine assembly of claim 1, further comprising an epicyclical gear train disposed within the gearbox, the epicyclical gear train being configured to connect the flexible coupling shaft to the gearbox.

9. The engine assembly of claim 8, further comprising a propeller assembly having a propeller shaft that is configured to engage with the epicyclical gear train, wherein the engine core generates energy that is transferred to the propeller shaft.

10. The engine assembly of claim 8, wherein the epicyclical gear train comprises a sun gear and one or more planet gears configured to engage with the sun gear.

11. The engine assembly of claim 10, wherein each planet gear of the one or more planet gears includes a spur gear, and wherein the epicyclical gear train further comprises a ring gear that is configured to engage with each spur gear of each planet gear of the one or more planet gears.

12. The engine assembly of claim 10, wherein the flexible coupling shaft is configured to engage with the sun gear of the epicyclical gear train.

13. The engine assembly of claim 10, wherein the flexible coupling shaft is coupled to the sun gear of the epicyclical gear train via a flexible connection.

14. The engine assembly of claim 1, wherein the flexible coupling shaft is connected to the engine core via a fixed connection.

* * * * *